United States Patent Office 3,284,887
Patented Nov. 15, 1966

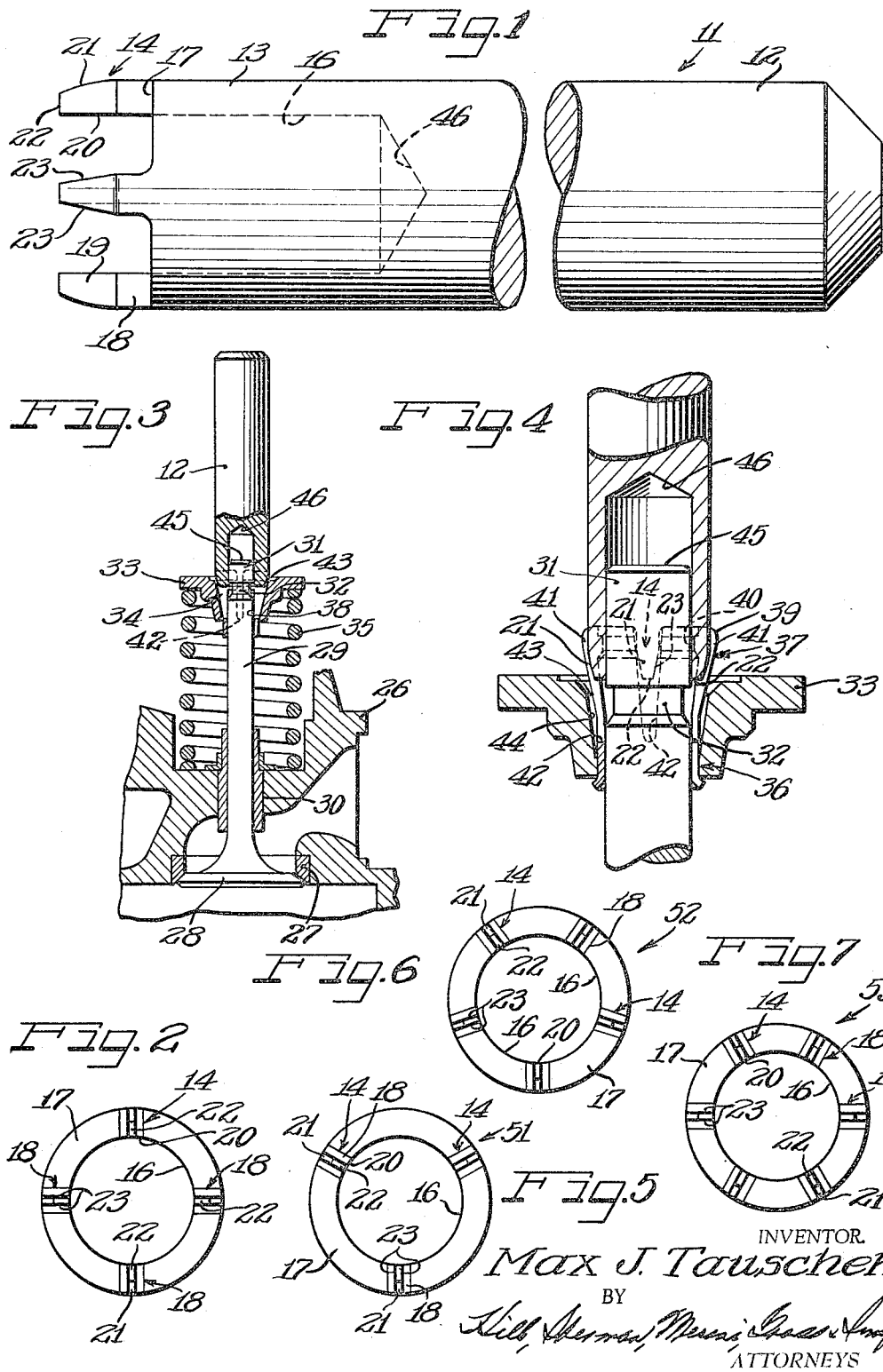

3,284,887
VALVE STEM LOCK TOOL
Max J. Tauschek, South Euclid, Ohio, assignor to TWR Inc., a corporation of Ohio
Filed Dec. 26, 1963, Ser. No. 333,483
2 Claims. (Cl. 29—249)

This invention generally relates to a valve stem retainer lock tool and more particularly relates to an expander tool that will slip over the tip end of a valve stem to spread the fingers or segments of a retainer lock for removal of the lock and retainer from the valve.

Engine poppet valve assemblies have the poppet valve stem provided with a peripheral groove near the tip end thereof for receiving ribs or beads of valve spring retainer locks, which wedge fit in the valve spring retainer. The tools of this invention are especially suited for unlocking one-piece tubular valve locks.

Known tools for removing locks from the valve stem required the operator to utilize both his hands. Usually the operator had to utilize two separate tools one to move the valve retainer relative to the retainer lock and one to expand the retainer lock to disengage it from the valve stem. This operation was time consuming. The present invention eliminates these problems by providing a simplified tool which may be manipulated with speed and accuracy to both expand the retainer lock and to move the retainer relative to the retainer lock when it is desired to place the retainer in position or remove it from a valve stem.

Therefore, it is an object of the present invention to provide an improved retainer lock tool.

It is another object of the present invention to provide an improved retainer lock tool to simultaneously expand a retainer lock positioned in a retainer and to move the retainer relative to the retainer lock.

It is another object of the present invention to provide a retainer lock tool which may be manipulated by the operator utilizing only one hand.

It is still further another object of the present invention to provide a retainer lock tool having a removing portion with a tubular body having an inner diameter equal to the outer diameter of the valve stem, and having a plurality of expanders projecting axially from the periphery thereof which are utilized to expand a retainer lock and also to move the retainer relative to the retainer lock.

It is still another object of the present invention to provide a retainer lock tool having means to encompass the tip end of the valve stem and means projecting from the end thereof to expand the retainer lock and simultaneously move the retainer relative to the retainer lock.

Other objects, features, and advantages of the present invention will become apparent to those skilled in the art after a careful consideration of the following description taken in conjunction with the drawing wherein like reference numerals refer to like and corresponding parts.

In the drawings:

FIGURE 1 is a partial longitudinal elevational view illustrating a retainer lock tool constructed in accordance with the principles of the present invention;

FIGURE 2 is a front view of the retainer lock tool illustrated in FIGURE 1;

FIGURE 3 is a longitudinal cross-sectional view with parts in elevation of the retainer lock tool positioned adjacent a valve stem retainer;

FIGURE 4 is an enlarged longitudinal cross-sectional view with parts in elevation illustrating the retainer lock tool illustrated in FIGURE 1 in its removing position on a valve stem;

FIGURE 5 is a front view similar to FIGURE 2, illustrating another retainer lock tool constructed in accordance with the principles of the present invention;

FIGURE 6 is a front view similar to FIGURE 2, of another retainer lock tool constructed in accordance with the principles of the present invention; and FIGURE 7 is a front view, similar to FIGURE 2, of still another retainer lock tool constructed in accordance with the principles of the present invention.

As shown in the drawings:

Referring to FIGURES 1 and 2, there is illustrated a retainer lock tool 11 having a solid cylindrical handle 12 with a tubular cylindrical head portion 13 on the end thereof from which axially extend a plurality of circumferentially spaced integral expanders or teeth 14.

The head portion 13 forms a cylindrical cavity 16 which has a diameter slightly larger than the outer diameter of a valve stem and has a length adapted to receive therein the tip end of the valve stem so as to have its annular end wall 17 move beyond the valve stem groove as will be hereinafter described in greater detail.

The end wall 17 has the four expanders 14 axially extending therefrom and said expanders are equally spaced from each other. Each expander 14 has a base arcuate portion 18 and a front arcuate portion 19. The base and front portions 18 and 19 have an inner wall 20 that extends continuous with the cavity wall 16. The base portion 18 has a thickness equal to the thickness of the annular wall 17 and the forward end 19 has an outer surface 21 converging from the base portion 18 to its radial end face 22 with two side walls 23 converging from the base portion 18 to the end face 22.

The retainer lock tool may be utilized with a conventional poppet valve assembly as illustrated in FIGURE 3. Referring to FIGURES 3 and 4, reference numeral 26 generally indicates an engine part such as for example a portion of the cylinder head of an internal combustion engine. Seated within an appropriate recess in the cylinder head 26 is an annular valve seat 27 composed of material capable of withstanding a high temperature in corrosion conditions to which the valve assembly is subjected. A poppet valve 28 is seated against the valve seat and has a rod-like stem portion 29 slidably received within the valve stem guide 30. The tip end 31 of the stem 29 has a retainer lock groove 32. A valve spring retainer 33 having a valve stem retainer lock 34 is connected to the valve stem and a coil helical spring 35 has one end bottomed against the retainer 33 and the opposite end bottomed against the stationary portion of he cylinder head 26 to resist opening movement of the valve and return the valve to its closed position.

The one-piece valve retainer lock 34 has a split tubular base portion 36 and a top segmented portion 37. The top segmented portion 37 and the base portion 36 form with their inner walls a cylindrical passage 38 when in their non-expanded position and the top portion 37 also has its thickness gradually increasing from the base portion 36 to its end wall 39. Inwardly spaced from the end wall 39 is a rib 40 projecting from the inner surface of the top portion and adapted to abut the top wall of the valve stem groove 32 to maintain the spring retainer 33 in position. The top portion 37 of the spring retainer lock 34 is divided into four segments 41 by four equally spaced slots 42 extending from the end wall 40 a predetermined distance into the base portion 36. The spring retainer 33 has an entrance mouth 43 converging to a conical wedge bore 44 receiving the lock 34. The bore 44 contracts the segments 41 into tight gripping engagement with the valve stem with the ribs 40 seated in the groove 32. The retainer 33 is thus locked on the stem.

When it is desired to remove the valve retainer 33 from the valve stem 29 in order to dismantle the valve, the retainer lock tool 11 is positioned (FIGURE 3) with its expander ends 22 facing a retainer mouth 43. The outer diameter of the expander base portion 18 is greater than the inner diameter of the retainer mouth 43 and the outer diameter of the end 22 is less than the inner diameter of the retainer mouth 43. The width of each expander lower portion 18 is greater than the width of the retainer lock grooves 42 and the width of the end face 22 is less than the width of the retainer lock grooves 42 when in their non-expanded condition. Therefore, when it is desired to remove the retainer, the tool 11 is positioned such that each expander tip end 22 will be within one of the retainer lock grooves 42 and the valve stem tip 31 will be within the tool cavity 16 with its end wall 45 spaced from the tool cavity end wall 46. By urging the tool towards the valve 28 the outer surface 21 of each expander engages inner walls 44 of the retainer to axially urge the retainer relative to the retainer lock and simultaneously, the expander side walls 23 gradually expand the retainer lock grooves 42 to increase the diameter of the retainer lock upper portion and disengage the rib 40 from the valve stem groove 32 wherein the inner diameter of the retainer lock rib 40 is greater than the outer diameter of the valve stem 29. When the valve retainer lock is in this expanded condition it is then possible to allow the retainer to move away from the valve 28 (FIGURE 4) and off the valve stem.

It is of course understood that the number of expanders depends upon the number of grooves in the valve retainer lock and therefore, said grooves will be predetermined in such manner.

Referring to FIGURE 5, there is a valve retainer lock tool 51 similar to lock tool 11 except said lock tool has three equally spaced expanders 14. Likewise, FIGURE 6 illustrates another retainer lock tool 52 having five expanders 14 and FIGURE 7 illustrates a retainer lock tool 53 having six expanders 14.

Therefore, it is seen where I have provided a retainer lock tool which is capable of removing the tool in a simple and easy fashion which was heretofore unknown. However, although the above invention was described in accordance with the preferred embodiments thereof, it is apparent that modifications and variations may be effected without departing from the scope of the novel concepts of the present invention and it will be understood that I intend that this invention be limited only by the scope of the hereunto appended claims.

I claim as my invention:

1. A one-piece valve stem retainer lock tool adapted for removing from a grooved valve stem, a spring retainer having a conical bore wedging a stem lock having internally beaded fingers embracing a valve stem with the beads seated in the groove of the stem which comprises a rod-like member having a recessed end adapted to freely receive a valve stem, said end having portions adapted to seat in the bore of the retainer for depressing the retainer out of wedged engagement with the stem lock, and circumferentially spaced teeth projecting from said portions terminating in blunt ends and having converging sides for engaging the fingers of the lock to spread the fingers sufficiently for removal of the beads thereon from the stem groove, whereby the retainer and lock assembly can be retracted from the valve stem.

2. A one-piece valve stem retainer lock tool adapted for removing from a grooved valve stem, a spring retainer having a conical bore wedging a stem lock having internally beaded fingers embracing a valve stem with the beads seated in the groove of the stem which comprises a rod-like member having a recessed end adapted to freely receive a valve stem, said end having portions for depressing the retainer out of wedged engagement with the stem lock, and circumferentially spaced teeth projecting from said portions terminating in blunt ends and having converging sides for engaging the fingers of the lock to spread the fingers sufficiently for removal of the beads thereon from the stem groove, whereby the retainer and lock assembly can be retracted from the valve stem.

References Cited by the Examiner

UNITED STATES PATENTS

| 1,683,796 | 9/1928 | Pearce. |
| 2,853,723 | 9/1958 | Winslow. |
| 3,000,097 | 9/1961 | Hartz. |

FOREIGN PATENTS 976,160  11/1963  Great Britain.

WILLIAM FELDMAN, *Primary Examiner.*

J. C. PETERS, *Assistant Examiner.*